US009050658B2

(12) United States Patent
Hecht

(10) Patent No.: US 9,050,658 B2
(45) Date of Patent: Jun. 9, 2015

(54) CUTTING INSERT WITH BOTTOM STOPPER SURFACE BETWEEN BOTTOM ABUTMENT SURFACES AND CUTTING TOOL THEREFOR

(75) Inventor: Gil Hecht, Nahariya (IL)

(73) Assignee: Iscar, Ltd., Tefen (IL)

( * ) Notice: Subject to any disclaimer, the term of this patent is extended or adjusted under 35 U.S.C. 154(b) by 408 days.

(21) Appl. No.: 13/556,966

(22) Filed: Jul. 24, 2012

(65) Prior Publication Data
US 2014/0030035 A1   Jan. 30, 2014

(51) Int. Cl.
*B23B 27/04* (2006.01)
*B26D 3/06* (2006.01)
*B23B 29/04* (2006.01)

(52) U.S. Cl.
CPC .............. *B23B 27/04* (2013.01); *B23B 2205/02* (2013.01); *Y10T 407/2288* (2015.01)

(58) Field of Classification Search
CPC .. B23B 27/045; B23B 2205/02; B23B 29/04; B23B 27/04; Y10T 407/2288
USPC ........................ 407/113, 117, 107–110, 50, 91
See application file for complete search history.

(56) References Cited

U.S. PATENT DOCUMENTS

| 195,699 | A | * | 10/1877 | Burger ........................... 83/843 |
| 1,326,797 | A | | 12/1919 | Sly et al. |
| 1,608,182 | A | * | 11/1926 | Pospiech ........................ 83/841 |
| 3,551,975 | A | * | 1/1971 | Novkov ........................ 407/117 |
| 3,785,021 | A | * | 1/1974 | Norgren ........................ 407/110 |
| 3,887,975 | A | * | 6/1975 | Sorice et al. ................... 407/47 |
| 3,889,331 | A | | 6/1975 | Grungras |
| 4,363,576 | A | * | 12/1982 | Zweekly ........................ 407/50 |
| 4,417,833 | A | * | 11/1983 | Wertheimer ................... 407/61 |
| 4,443,136 | A | * | 4/1984 | Kemmer ........................ 407/72 |
| 4,558,974 | A | | 12/1985 | Pano |
| 4,580,930 | A | * | 4/1986 | Zinner ........................ 407/110 |
| 4,588,333 | A | | 5/1986 | Gustafson |
| 4,801,224 | A | * | 1/1989 | Pettersson et al. ............ 407/110 |

(Continued)

FOREIGN PATENT DOCUMENTS

| DE | 3313693 A1 | 10/1984 |
| DE | G 86 24 281.4 U1 | 7/1987 |

(Continued)

OTHER PUBLICATIONS

International Search Report dated Oct. 28, 2013 issued in PCT counterpart application (No. PCT/IL2013/050536).

*Primary Examiner* — Sunil K Singh
*Assistant Examiner* — Sara Addisu
(74) *Attorney, Agent, or Firm* — Womble Carlyle

(57) ABSTRACT

A cutting insert has an upper abutment portion at an upper surface thereof, and two bottom abutment portions and a stopper portion, at a bottom surface thereof. The two bottom abutment portions define bottom planes, parallel and spaced apart from one another. The upper abutment surface defines an upper plane, forming a first angle with the bottom planes. The cutting insert has a relief surface at a front surface thereof, forming a cutting edge with a rake surface formed at the upper surface. The stopper portion defines a stopper plane, which forms a second angle with a relief plane defined by the relief surface. A reference plane perpendicular to the upper plane, passing through the upper abutment portion, intersects the first and second bottom planes at first and second intersection lines, which are spaced apart from the first and second bottom abutment portions.

26 Claims, 10 Drawing Sheets

(56) References Cited

U.S. PATENT DOCUMENTS

| | | | |
|---|---|---|---|
| 4,909,677 A * | 3/1990 | Noguchi et al. | 407/66 |
| 4,938,640 A * | 7/1990 | Pano et al. | 407/110 |
| 5,059,068 A * | 10/1991 | Scott | 407/9 |
| 5,085,541 A * | 2/1992 | Simpson, III | 407/110 |
| 5,156,502 A * | 10/1992 | Satran | 407/110 |
| 5,161,920 A * | 11/1992 | Zinner | 407/110 |
| 5,346,335 A | 9/1994 | Harpaz et al. | |
| 5,360,298 A * | 11/1994 | Hedlund | 407/110 |
| 5,411,354 A * | 5/1995 | Gustafsson | 407/110 |
| 5,743,680 A * | 4/1998 | Von Haas et al. | 407/19 |
| 5,820,309 A * | 10/1998 | Mihic | 407/50 |
| 5,829,924 A * | 11/1998 | Oshnock et al. | 407/110 |
| 5,921,724 A * | 7/1999 | Erickson et al. | 407/117 |
| 5,947,648 A * | 9/1999 | Friedman et al. | 407/5 |
| 6,116,823 A * | 9/2000 | Mihic | 407/40 |
| 6,176,649 B1 * | 1/2001 | Friedman | 407/110 |
| 6,234,727 B1 | 5/2001 | Barazani | |
| 6,565,292 B2 * | 5/2003 | Hecht | 407/110 |
| 6,579,044 B1 * | 6/2003 | Trenkwalder et al. | 407/110 |
| 7,326,007 B2 * | 2/2008 | Hecht | 407/109 |
| 7,407,347 B2 * | 8/2008 | Virtanen et al. | 407/110 |
| 7,524,147 B2 * | 4/2009 | Hecht | 407/107 |
| 8,317,434 B2 * | 11/2012 | Oettle | 407/110 |
| 8,376,664 B2 * | 2/2013 | Hecht | 407/107 |
| 8,388,270 B2 * | 3/2013 | Waggle et al. | 407/49 |
| 8,647,023 B2 * | 2/2014 | Volokh et al. | 407/41 |
| 8,647,028 B2 * | 2/2014 | Athad | 407/110 |
| 8,647,029 B2 * | 2/2014 | Hecht | 407/110 |
| 8,695,189 B2 * | 4/2014 | Hecht | 29/267 |
| 8,701,537 B2 * | 4/2014 | Baernthaler et al. | 83/843 |
| 8,708,610 B2 * | 4/2014 | Hecht | 407/40 |
| 8,764,351 B2 * | 7/2014 | Hecht | 407/108 |
| 2010/0254773 A1 | 10/2010 | Hecht | |

FOREIGN PATENT DOCUMENTS

| | | | | |
|---|---|---|---|---|
| DE | G 90 15 969.1 U1 | 3/1991 | | |
| DE | 4239701 A1 | 6/1993 | | |
| DE | 100 10 223 A1 | 9/2001 | | |
| DE | 10 2005 014 121 A1 | 9/2006 | | |
| DE | 102005014121 A1 | 9/2006 | | |
| EP | 1591179 A2 * | 11/2005 | | B23B 27/04 |

* cited by examiner

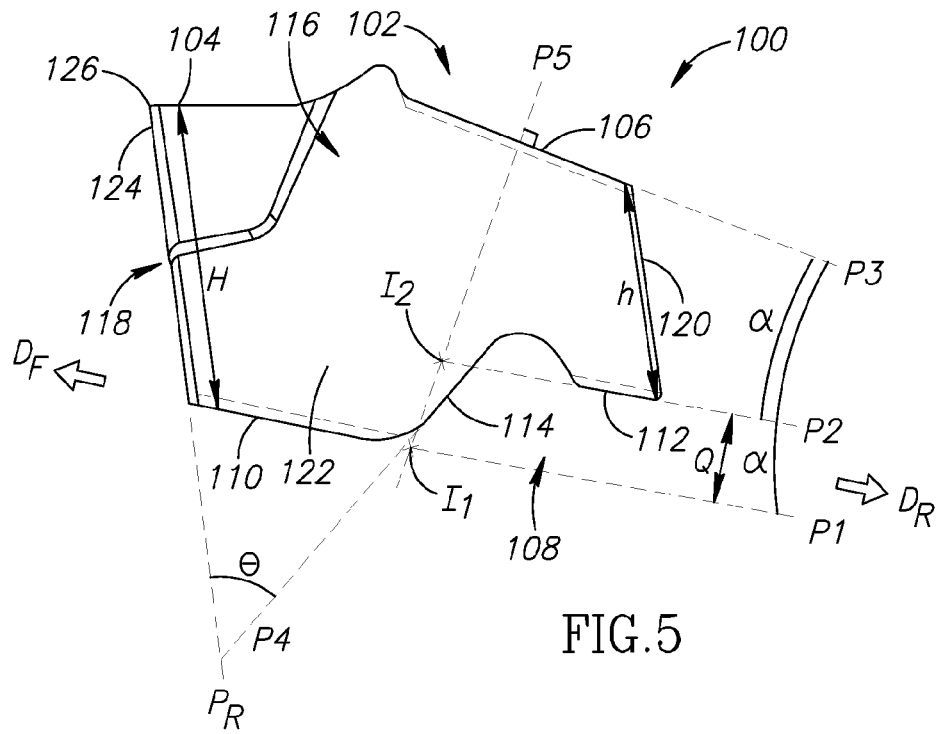
FIG.5
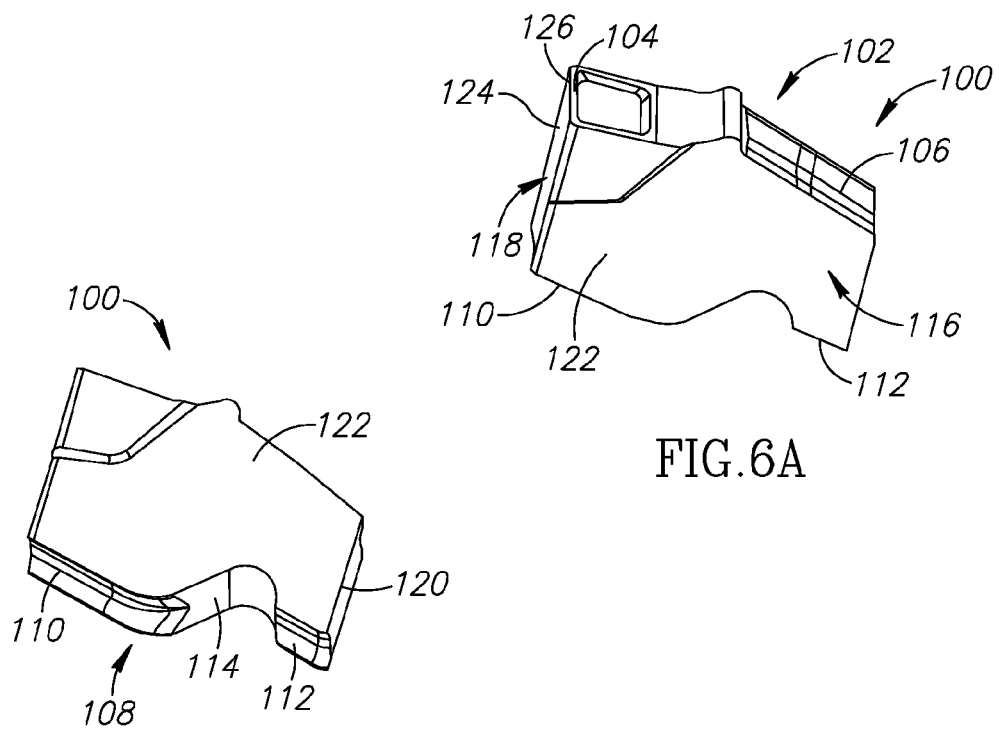
FIG.6A
FIG.6B

US 9,050,658 B2

CUTTING INSERT WITH BOTTOM STOPPER SURFACE BETWEEN BOTTOM ABUTMENT SURFACES AND CUTTING TOOL THEREFOR

FIELD OF THE INVENTION

The present invention relates to a cutting insert and a cutting tool holder blade for retaining the cutting insert, in general, and to a cutting insert and cutting tool for parting and grooving operations, in particular.

BACKGROUND OF THE INVENTION

Metal cutting tools used in turning operations, including cutting inserts which are removably secured in a tool holder, have provided a cutting insert of a suitably hard material, i.e. cemented carbide, where the tool holder is manufactured from a less hard material and is reusable following the disposal of a worn or damaged cutting insert. In particular, metal cutting tools for parting and grooving have a holder blade for firmly clamping a cutting insert within a tool holder blade.

In certain tools, the cutting insert is self-clamped into an insert pocket or slot formed in the holder blade, having appropriate size and length. In some cases the cutting insert is mounted and extracted to the tool holder by employing a key. Some cutting inserts have positioning arrangements for positioning the cutting insert in a desired location in the cutting tool, or for determining the extent of entry of the cutting insert into the tool holder. Examples of such cutting tools and cutting inserts are disclosed in U.S. Pat. Nos. 1,326,797, 3,889,331, 4,558,974, 5,829,924, 6,565,292, DE862,4281U1, DE9015969U1, DE102005014121A1 and DE10010223A1.

It is an object of the present invention to provide a cutting insert for parting and grooving applications, and a tool holder for holding such a cutting insert. The cutting insert has two parallel non-coplanar bottom abutment portions, and an angled stopper abutment portion located therebetween. The cutting insert also has an upper abutment portion. A front height dimension of the cutting insert is greater than a rear height dimension of the cutting insert. In a certain embodiment, the cutting insert further has an insert key recess for receiving a member of a cutting tool key, for mounting the cutting insert into, and extracting it from the tool holder. In another embodiment, the tool holder has a clamping screw for tightening the insert receiving pocket, and retaining the cutting insert therein.

SUMMARY OF THE INVENTION

In accordance with one aspect of the present invention, there is provided a cutting insert, comprising:
  an upper surface including:
    a rake surface; and
    an upper abutment portion defining an upper plane;
  a bottom surface including:
    a first bottom abutment portion defining a first bottom plane, forming a first angle with the upper plane;
    a second bottom abutment portion defining a second bottom plane parallel to the first bottom plane and spaced apart therefrom; and
    a stopper abutment portion located between the first and second bottom abutment portions;
  a peripheral surface including a front surface, a rear surface, and two insert side surfaces extending therebetween, the front surface having a relief surface; and
  a cutting edge formed at the intersection of the rake surface and the relief surface, and wherein a reference plane perpendicular to the upper plane and passing through the upper abutment portion, intersects the first and second bottom planes at first and second intersection lines, respectively, the first and second intersection lines being spaced apart from the first and second bottom abutment portions, respectively.

In accordance with another aspect of the present invention, there is further provided a cutting tool comprising a holder blade and a cutting insert as described above retained therein, wherein:
  the holder blade comprises:
    an upper jaw having an upper jaw clamping surface;
    a lower jaw having a first lower jaw clamping surface, a second lower jaw clamping surface, and a lower jaw stopper surface located between the first and second lower jaw clamping surfaces; and
    an insert receiving pocket defined between the upper jaw and the lower jaw; and
    a holder passage located in the lower jaw below the insert receiving pocket in a side view of the holder blade,
  the cutting insert is resiliently retained within the insert receiving pocket, such that the upper abutment portion abuts the upper jaw clamping surface, the first and second bottom abutment portions respectively abut the lower jaw first and second clamping surfaces, and the stopper abutment portion abuts the lower jaw stopper surface, thereby limiting the extent of insertion of the cutting insert into the insert receiving pocket.

In accordance with yet another aspect of the present invention, there is further provided a cutting tool comprising a holder blade and a cutting insert as described above retained therein, wherein:
  the holder blade comprises:
    an upper jaw having an upper jaw clamping surface;
    a lower jaw having a first lower jaw clamping surface, a second lower jaw clamping surface, and a lower jaw stopper surface located between the first and second lower jaw clamping surfaces; and
    an insert receiving pocket defined between the upper jaw and the lower jaw;
    a release slot opening out to, and extending from the insert receiving pocket; and
    a clamping bore passing through the release slot, for receiving a clamping screw,
  when the clamping screw is fastened in the clamping bore, the insert receiving pocket is tightened until the cutting insert is resiliently retained therein, the upper abutment portion abuts the upper jaw clamping surface, the first and second bottom abutment portions respectively abut the lower jaw first and second clamping surfaces, and the stopper abutment portion abuts the lower jaw stopper surface, thereby limiting the insertion of the cutting insert into the insert receiving pocket.

In accordance with still another aspect of the present invention, there is further provided a holder blade comprising:
  two longitudinally extending holder side surfaces;
  an upper jaw having an upper jaw clamping surface defining an upper jaw plane;
  a lower jaw connected to the upper jaw, the lower jaw having a first lower jaw clamping surface, a second lower jaw clamping surface and a lower jaw stopper surface located between the first and second lower jaw clamping surfaces, wherein the second lower jaw clamping surface forms a third angle with the upper jaw plane and is parallel to and spaced apart from the first lower jaw clamping surface;

an insert receiving pocket defined between the upper jaw and the lower jaw, the insert receiving pocket having a closed rearmost end; and a holder passage located in the lower jaw below the insert receiving pocket in a side view of the holder blade.

BRIEF DESCRIPTION OF THE DRAWINGS

For a better understanding, the invention will now be described, by way of example only, with reference to the accompanying drawings, in which:

FIG. 5 is a side view of the cutting insert of the cutting tool shown in FIG. 1;

FIG. 6A is a perspective view of the cutting insert shown in FIG. 5;

FIG. 6B is another perspective view of the cutting insert shown in FIG. 5;

Figure 1:
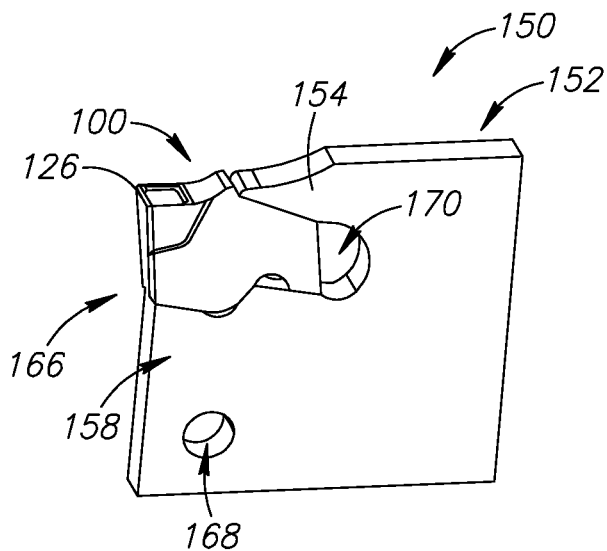
FIG. 1 is a schematic illustration perspective view of a cutting tool in accordance with an embodiment of the present invention, in the assembled position.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

The present invention relates to a cutting insert, and a cutting tool having a tool holder for resiliently retaining the cutting insert in an insert receiving pocket. The cutting insert has a stopper portion for limiting the insertion into the insert receiving pocket, by abutting against a corresponding stopper surface located in the insert receiving pocket. The cutting insert may be mounted to, and extracted from the tool holder by means of a cutting tool key acting on the cutting insert on the front or rear surface thereof, or via an insert key recess formed in the cutting insert.

Figure 2:
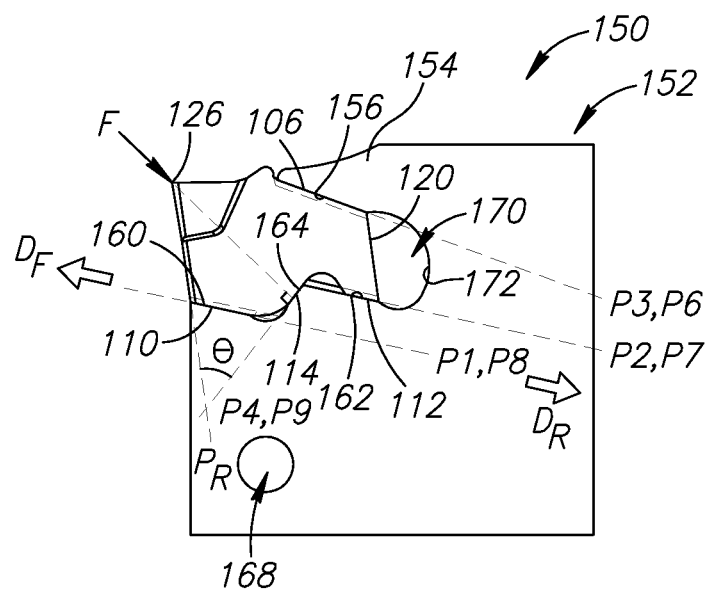
FIG. 2 is a side view of the cutting tool shown in FIG. 1.

Reference is first made to FIGS. 1 and 2, respectively depicting a perspective view and a side view of a cutting tool, in accordance with an embodiment of the present invention. The cutting tool 150 includes a holder blade 152 and a cutting insert 100.

Figure 3:
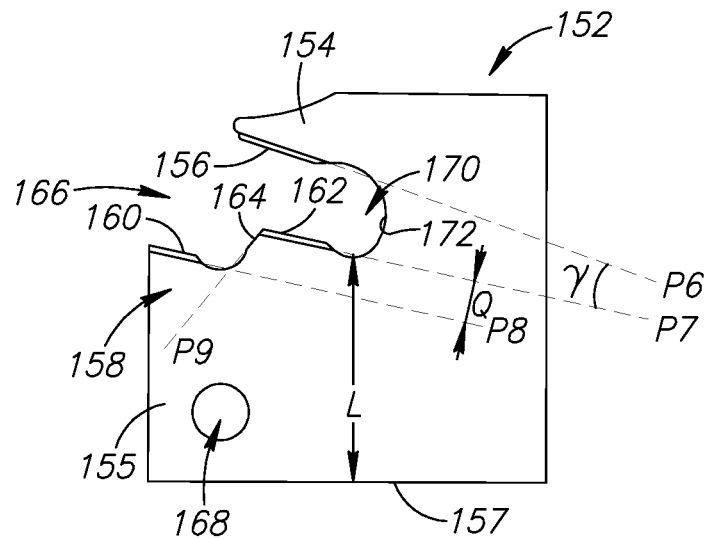
FIG. 3 is a side view of the holder blade of the cutting tool shown in FIG. 1.
Figure 4:
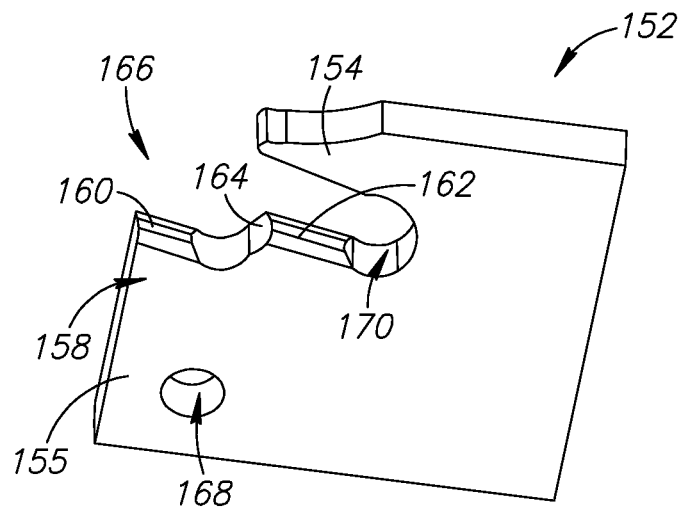
FIG. 4 is a perspective view of the holder blade shown in FIG. 3.

With further reference to FIGS. 3 and 4, the holder blade 152 is depicted in a side view and a perspective view, respectively. The holder blade 152 includes an upper jaw 154, a lower jaw 158, and an insert receiving pocket 166 defined therebetween. The upper jaw 154 has an upper jaw clamping surface 156. The lower jaw 158 has a first lower jaw clamping surface 160, a second lower jaw clamping surface 162, and a lower jaw stopper surface 164. The lower jaw stopper surface 164 is located between the first and second lower jaw clamping surfaces 160, 162.

The holder blade 152 also includes two longitudinally extending holder side surfaces 155, and a transverse holder passage 168, opening out to the holder side surfaces 155. A holder lower end surface 157 extends between the holder side surfaces at a lower end of the holder blade 152. The holder passage 168 is formed in the lower jaw 158 between the insert receiving pocket 166 and the holder lower end surface 157, i.e., below the insert receiving pocket 166 in a side view of the holder blade 152. The insert receiving pocket 166 has a closed rearmost end 172, forming a pocket key recess 170. In an assembled position of the cutting tool 150, the cutting insert 100 is resiliently retained within the insert receiving pocket 166, as elaborated herein below.

Reference is further made to FIGS. 5, 6A and 6B, depicting a side view and perspective views of the cutting insert 100, respectively. The cutting insert 100 includes an upper surface 102, a bottom surface 108 and a peripheral surface 116 extending therebetween. The upper surface 102 has a rake surface 104 and an upper abutment portion 106. The upper abutment portion 106 defines an upper plane P3.

The bottom surface 108 includes a first bottom abutment portion 110, a second bottom abutment portion 112 and a stopper abutment portion 114. The first bottom abutment portion 110 defines a first bottom plane P1, which forms a first angle α with the upper plane P3. In a side view of the cutting insert 100 (e.g., FIG. 2), the first bottom plane P1 extends in a forward to rearward direction $D_F$, $D_R$. The second bottom abutment portion 112 defines a second bottom plane P2 located between the first bottom plane P1 and the upper plane P3. The second bottom plane P2 is parallel to the first bottom plane P1 and so also forms the first angle α with the upper plane P3. The second bottom plane P2 is spaced apart from the first bottom plane P1 by a stopper height Q. Thus, the first and second bottom abutment portions 110, 112 are parallel and non-coplanar. The stopper abutment portion 114 is located between the first and second bottom abutment portions 110, 112.

The peripheral surface 116 includes a front surface 118, a rear surface 120, and two insert side surfaces 122 extending therebetween. The front surface 118 has a relief surface 124 adjacent the upper surface 102. A cutting edge 126 is formed at the intersection of the rake surface 104 and the relief surface 124. In some embodiments, the stopper abutment portion 114 may define a stopper plane P4, and the relief surface 124 may define a relief plane $P_R$, which forms a second angle θ with the stopper plane P4, in a side view of the cutting insert 100. The second angle θ is an acute angle, which may be in the range of 30°-70°. In particular, the second angle θ may be a 50° angle.

In the cutting insert 100, the first angle α is an acute angle greater than zero, such that the first and second bottom planes P1, P2 are tilted relative to the upper plane P3, and the cutting insert 100 has a rearwardly converging wedge form. This allows for a better friction fit of the cutting insert 100 with the upper and lower jaws 154, 158.

The front surface 118 has a front height dimension H and the rear surface 120 has a rear height dimension h. The front height dimension H is greater than the rear height dimension h. In particular, the front height dimension H may be between 1.2-2 times greater than the rear height dimension h. Further, the rear height dimension h is greater than the stopper height Q. In particular, the rear height dimension h may be between 1.2-3 times greater than the stopper height Q.

In a side view of the holder blade 152, the vertical distance between the lowest point of the rearmost end 172 of the holder blade 152, and the holder lower end surface 157, is referred to as a lower jaw height L. The height of the insert receiving pocket 166 adjacent the rearmost end 172, is similar to the rear height dimension h of the cutting insert 100. Since the rear height dimension h is smaller than the front height dimension H, it is possible to increase the lower jaw height L (i.e., compared to a cutting insert with a front height dimension H, in which the rear height dimension is similar to the front height dimension). This increases the rigidity of the holder blade 152 for cutting forces, and reduces the chance of fracture or breakage of the holder 152, in the vicinity of the rearmost end 172.

The parallel relation between the first and second bottom planes P1, P2, provides a further advantage to the cutting insert 100, by simplifying the manufacturing of the cutting insert 100 (e.g., by pressing cemented carbide powder in dies). This parallel structure better defines the spatial relation between the first and second bottom abutment portions 110, 112. Further, the parallel relation between the first and second bottom planes P1, P2 allows the cutting insert 100 to be inserted into the insert receiving pocket 166, by flush straight insertion, i.e., without rotation of the cutting insert 100, or contacting any obstacles or additional retaining features during insertion.

In the holder blade 152, the upper jaw clamping surface 156 defines an upper jaw plane P6, and the second lower jaw clamping surface 162 defines a second lower jaw plane P7. The second lower jaw plane P7 forms a third angle γ with the upper jaw plane P6. According to a preferred embodiment of the present invention, the third angle γ is similar to, or smaller than the first angle α, to allow a more resilient clamping press fit (i.e., friction fit) of the cutting insert 100 with the upper and lower jaws 154, 158. For example, the third angle γ may be smaller than the first angle α by 0.5°-2°. The first lower jaw clamping surface 160 defines a first lower jaw plane P8, which is parallel to, and spaced apart from the second lower jaw plane P7, by the stopper height Q. The lower jaw stopper surface 164 defines a pocket stopper plane P9.

In an assembled position of the cutting tool 150 (FIGS. 1-2), the cutting insert 100 is resiliently retained within the insert receiving pocket 166. In this position, the upper abutment portion 106 abuts the upper jaw clamping surface 156, and the first and second bottom abutment portions 110, 112 respectively abut the lower jaw first and second clamping surfaces 160. Further, the stopper abutment portion 114 abuts the lower jaw stopper surface 164, thereby limiting the extent of insertion of the cutting insert 100 into the insert receiving pocket 166 (i.e., preventing the cutting insert 100 from moving further into the insert receiving pocket 166). In this position, the rear surface 120 of the cutting insert 100 remains free, and does not contact the insert receiving pocket 166. The rear surface 120 faces the rearmost end 172 of the insert receiving pocket 166, and is located adjacent the pocket key recess 170. Further, in this position, the first and second bottom planes P1, P2 substantially coincide with the first and second lower jaw planes P8, P7, respectively. The upper plane P3 and the stopper plane P4 substantially coincide with the upper jaw plane P6 and the pocket stopper plane P9, respectively.

Indicated in FIG. 2, when the cutting tool 150 is employed in metal cutting operations, a cutting force component F is applied on the cutting edge 126, from a machined work piece. Since the stopper plane P4 forms the second angle θ with the relief plane $P_R$, the stopper plane P4 is positioned substantially perpendicular to the direction of the cutting force component F. In particular, the second angle θ is an acute angle, such that the stopper abutment portion 114 is tilted in the rearward direction $D_R$, and the stopper plane P4 is substantially perpendicular to the direction of the cutting force component F. In this position, the normal force acting on the stopper abutment portion 114 counters the cutting force component F, thereby keeping the cutting insert 100 stably retained within the insert receiving pocket 166. This provides the cutting insert 100 with further resilience against machining forces, such as the cutting force component F.

As indicated in FIG. 5, a reference plane P5 extends perpendicular to the upper plane P3 and passes through the upper abutment portion 106. The reference plane P5 intersects the first bottom plane P1 at a first intersection line I1, which is spaced apart from the first bottom abutment portion 110. Similarly, the reference plane P5 intersects the second bottom plane P2 at a second intersection line I2, which is spaced apart from the second bottom abutment portion 112. In particular, in a side view, the first intersection line I1 is spaced apart from the first abutment portion 110 in the rearward direction $D_R$, and the second intersection line I2 is spaced apart from the second abutment portion 112 in the forward direction $D_F$. As seen in the side view of FIG. 5, the first intersection line I1 passes outside the cutting insert, while the second intersection line I2 passes through the cutting insert.

When the cutting insert is mounted in the holder blade 152, the location and orientation of the upper plane P3 provides a balanced fulcrum structure for the forces applied on the cutting insert 100. A resilient clamping force is applied by the upper clamping surface 156 perpendicular to the upper abutment portion 106, that is, along the reference plane P5. Further, resilient clamping forces are applied on the first and second bottom abutment surfaces 110, 112 of the cutting insert 100. Thus, due to the balanced fulcrum structure, the cutting insert 100 has a corresponding counter-support for the clamping forces applied on the upper surface 102 thereof.

According to some embodiments of the present invention, the upper abutment portion 106 and the first and second bottom abutment portions 110, 112, have a V-shaped cross section. The stopper abutment portion 114 may either be a substantially flat surface, or have a V-shaped cross section. Similarly, in the holder blade 152, the upper jaw clamping surface 156 and the first and second lower jaw clamping surfaces 160, 162, may have corresponding V-shape cross sections, as the abutment portions of the cutting insert 100. Such a V-shape cross section of the abutment portions in the cutting tool 150 provide better clamping of the cutting insert 100 in the insert receiving pocket 166, by providing a counter surface for possible side forces which may be applied on the cutting insert 100 during machining operations. It should be noted, that the planes P1, P2 and P3, may be defined by passing through both free ends of the V-shape of the cross section of the respective abutment surface.

Figure 7:
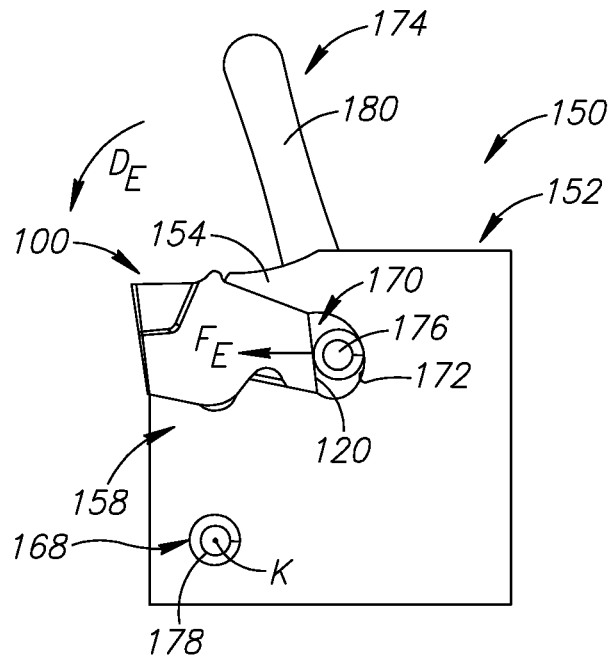
FIG. 7 is a side view of the cutting tool of FIG. 1 with a tool key, in an assembled position.
Figure 8:
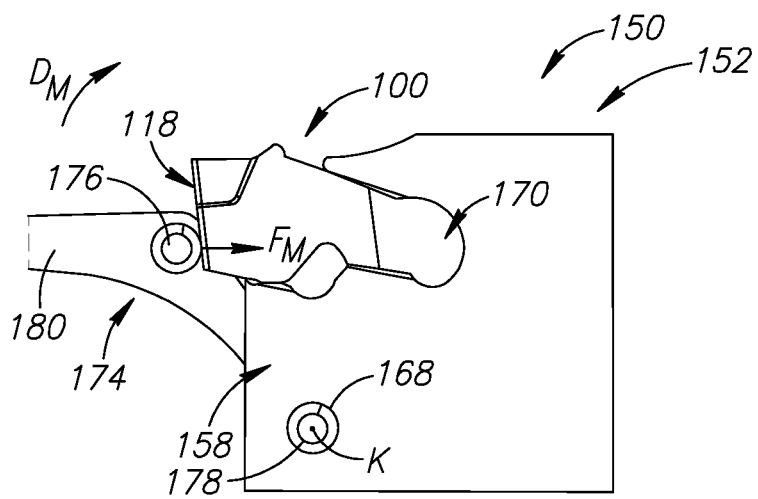
FIG. 8 is a side view of the cutting tool of FIG. 1 with a tool key, in a partially assembled position.

Reference is now made to FIGS. 7 and 8, depicting the cutting tool 150 in combination with a cutting tool key 174, in an assembled position (FIG. 7) and a partially assembled position (FIG. 8). The cutting insert 100 is releasable, and may be mounted to, and extracted from the holder blade 152, for example by employing the cutting tool key 174.

The cutting tool key 174 includes a key handle 180, a first key member 176 and a second key member 178. The first key member 176 is formed to fit into the pocket key recess 170 adjacent the cutting insert 100, and the second key member 178 is formed to fit into the holder passage 168. When the cutting tool 150 is in the assembled position, it may be desired to extract the cutting insert 100 out of the insert receiving pocket 166, for example, in order to replace the cutting insert 100. Then, the cutting tool key 174 is engaged to the cutting tool 150, such that the first key member 176 is located in the pocket key recess 170 and the second key member 178 is simultaneously located in the holder passage 168.

As mentioned herein above, in the assembled position, the rear surface 120 of the cutting insert 100 is free to the pocket key recess 170. In this manner, there is sufficient space for the first key member 176 to fit into the pocket key recess 170 adjacent the rear surface 120. Then, in order to extract the cutting insert 100 from the insert receiving pocket 166, the cutting tool key 174 is rotated in an extraction direction $D_E$, for example by applying an appropriate force on the key handle 180. During rotation of the cutting tool key 174, the second key member 178 remains within the holder passage 168, such that the cutting tool key 174 is rotated about the key axis K. The first key member 176 applies an extracting force $F_E$ on the cutting insert 100, through the rear surface 120 thereof. Due to the structure of the insert receiving pocket 166, the extracting force $F_E$ has a component in the forward direction $D_F$, pushing the cutting insert 100 out of the insert receiving pocket 166, until reaching the partially assembled position. The cutting insert 100 may then be pulled out, so as to be removed completely from the holder blade 152.

When mounting the cutting insert 100 into the insert receiving pocket 166, the cutting insert 100 is first inserted into the insert receiving pocket 166 up to the partially assembled position. Then, the cutting tool key 174 is positioned relative to the cutting tool 150, such that the first key member 176 is located adjacent the front surface 118 of the cutting insert, i.e., spaced apart from the pocket key recess 170. The second key member 178 is simultaneously located in the holder passage 168. Then, in order to mount the cutting insert 100 into the insert receiving pocket 166, the cutting tool key 174 is rotated in a mounting direction $D_M$, for example by applying an appropriate force on the key handle 180. During rotation of the cutting tool key 174, the second key member 178 remains within the holder passage 168, such that the cutting tool key 174 is rotated about the key axis K. The first key member 176 applies a mounting force $F_M$ on the cutting insert 100, through the front surface 118 thereof. Due to the structure of the insert receiving pocket 166, the mounting force $F_M$ has a component in the rearward direction $D_R$, advancing the cutting insert 100 into the insert receiving pocket 166, until reaching the assembled position, that is, until the stopper abutment portion 114 abuts the lower jaw stopper surface 164.

Figure 9:
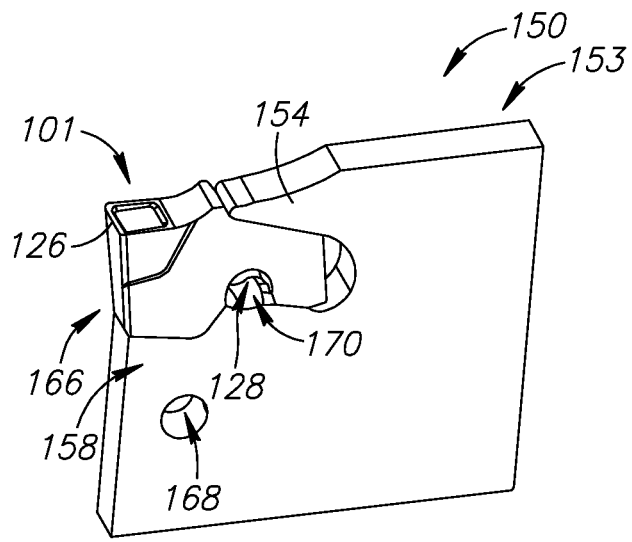
FIG. 9 is a schematic illustration perspective view of a cutting tool in accordance with another embodiment of the present invention, in the assembled position.
Figure 10:
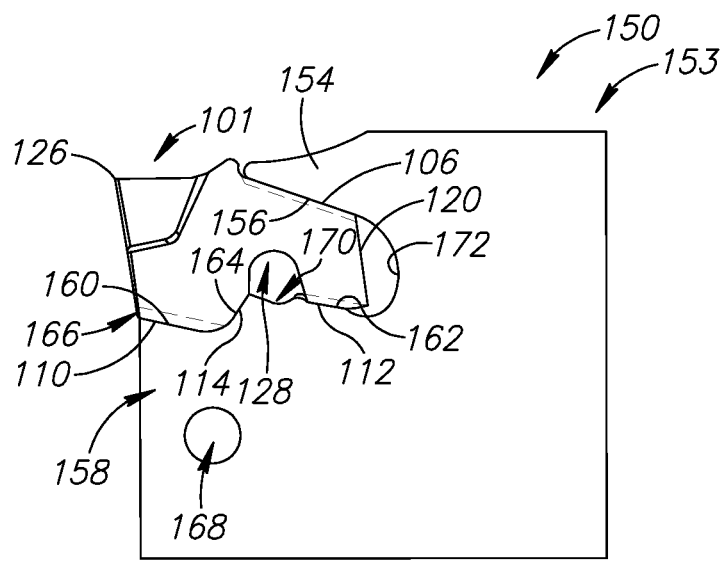
FIG. 10 is a side view of the cutting tool shown in FIG. 9.
Figure 13:
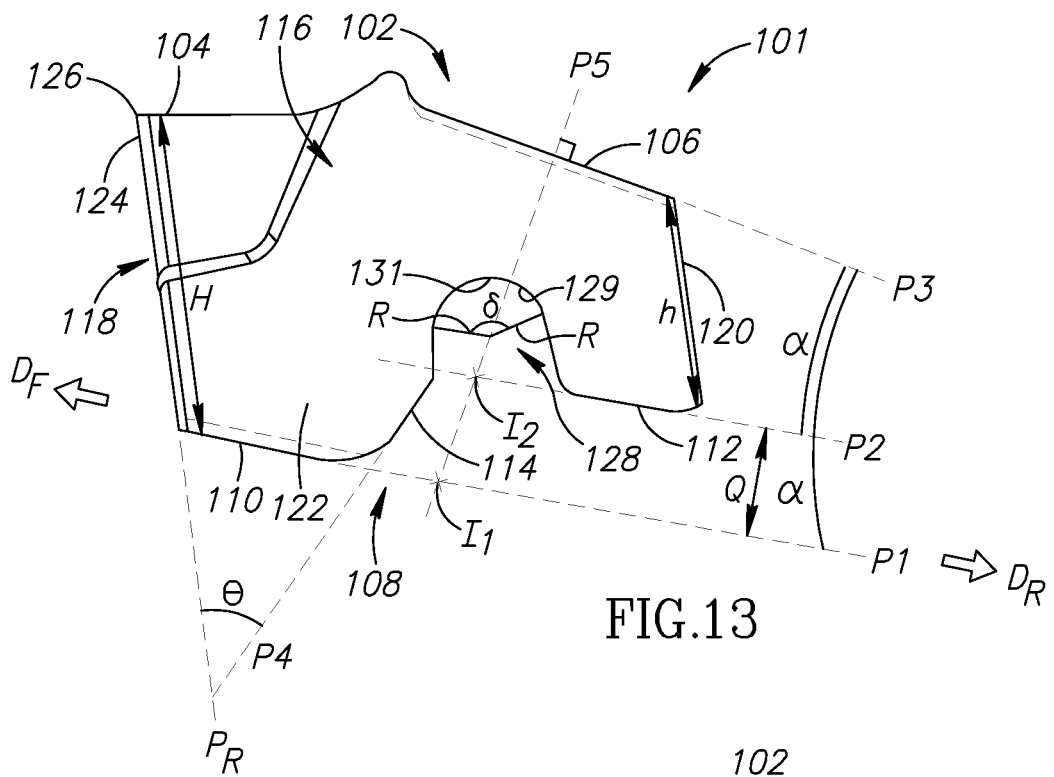
FIG. 13 is a side view of the cutting insert of the cutting tool shown in FIG. 9.
Figure 14A:
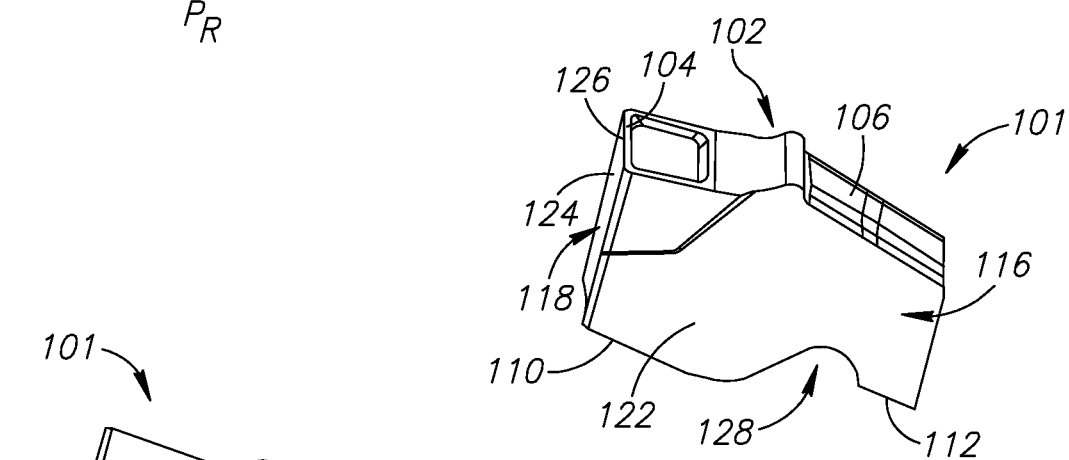
FIG. 14A is a perspective view of the cutting insert shown in FIG. 13.
Figure 14B:
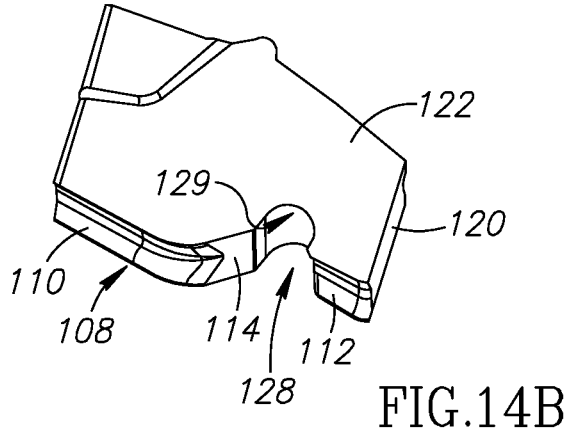
FIG. 14B is another perspective view of the cutting insert shown in FIG. 13.

Reference is now made to FIGS. 9 and 10, depicting a perspective view and a side view of a cutting tool 150, in accordance with another embodiment of the present invention. The cutting tool 150 includes a holder blade 153 and a cutting insert 101. With further reference to FIGS. 13, 14A and 14B, the cutting insert 101 is depicted in a side view and perspective views. The cutting insert 101 is similar to the cutting insert 100, and further includes an insert key recess 128 opening out to the bottom surface 108 and to the insert side surfaces 122.

Figure 11:
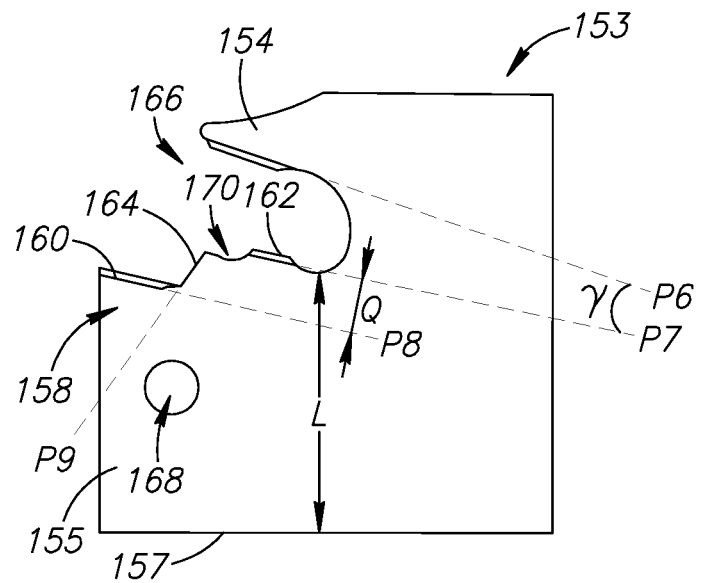
FIG. 11 is a side view of the holder blade of the cutting tool shown in FIG. 9.
Figure 12:
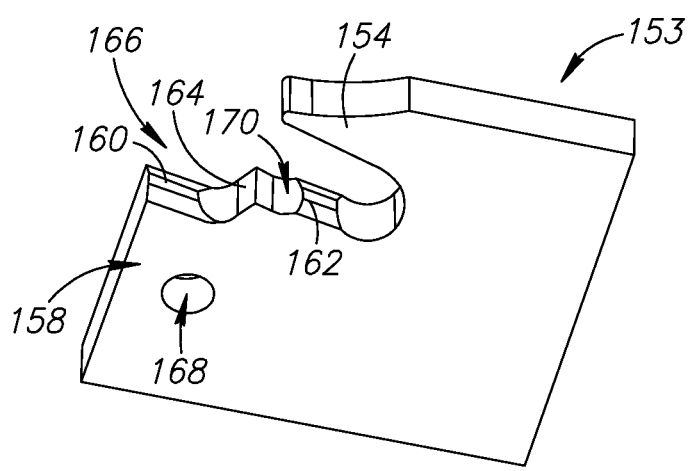
FIG. 12 is a perspective view of the holder blade shown in FIG. 11.

With further reference to FIGS. 11 and 12, the holder blade 153 is depicted in a side view and a perspective view. The holder blade 153 is similar to the holder blade 152, and with the pocket key recess 170 formed in the lower jaw 158 thereof, between the second lower jaw clamping surface 162 and the lower jaw stopper surface 164. The cutting insert 101 is resiliently clamped in the insert receiving pocket 166 of the holder blade 153, as elaborated herein above with respect to the cutting insert 100 and the holder blade 152. In the assembled position, the insert key recess 128 opens out to the pocket key recess 170.

Figure 15:
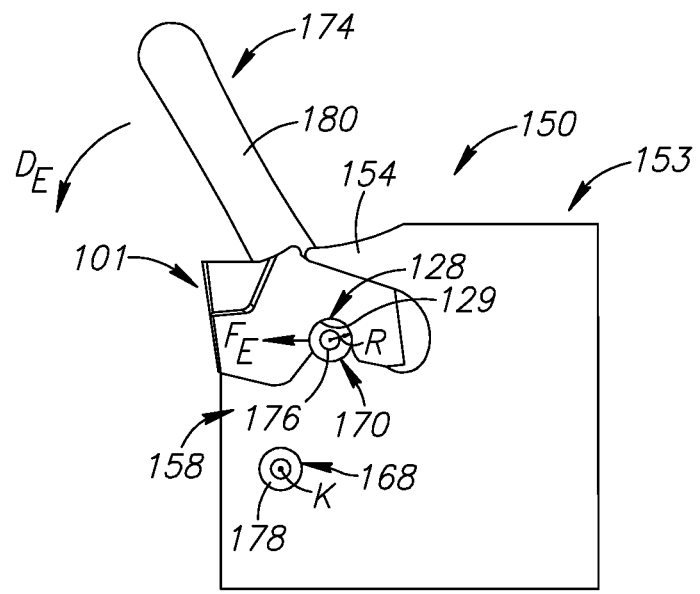
FIG. 15 is a side view of the cutting tool of FIG. 9 with a tool key, in an assembled position.
Figure 16:
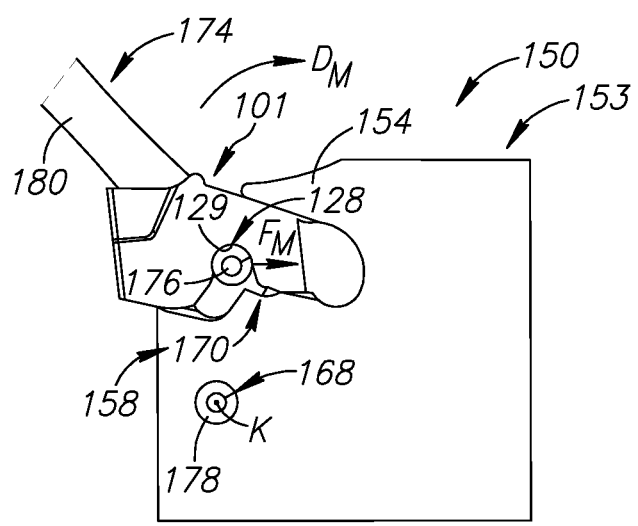
FIG. 16 is a side view of the cutting tool of FIG. 9 with a tool key, in a partially assembled position.

Reference is further made to FIGS. 15 and 16, depicting the cutting tool 150 in combination with the cutting tool key 174, in an assembled position (FIG. 15) and a partially assembled position (FIG. 16). The cutting insert 101 is releasable, and may be mounted to, and extracted from the holder blade 153, for example by employing the cutting tool key 174. The insert key recess 128 of the cutting insert 101 includes an insert recess wall 129 extending between the second bottom abutment portion 112 and the stopper abutment portion 114. The insert recess wall 129 has a circular wall portion 131, in a side view of the cutting insert 101. The circular wall portion 131 is a circular arc having a radius R, and subtending a recess angle δ. The first key member 176 of the cutting tool key 174 has a circular shape with a radius R, in a side view of the cutting tool key 174. Thus, the insert key recess 128, by its circular wall portion 131 is formed to accommodate the first key member 176.

When extracting the cutting insert 101 from the holder blade 153, the cutting tool key 174 is engaged to the cutting tool 150, with the first key member 176 located in the pocket key recess 170 as well as in the insert key recess 128 (i.e., adjacent the cutting insert 101), and the second key member 178 is simultaneously located in the holder passage 168. Then, the cutting tool key 174 is rotated in the extraction direction $D_E$, for example by applying an appropriate force on the key handle 180. During rotation of the cutting tool key 174, the second key member 178 remains within the holder passage 168, such that the cutting tool key 174 is rotated about the key axis K.

The first key member 176 applies an extracting force $F_E$ on the cutting insert 101, through the insert recess wall 129 of the insert key recess 128. Due to the structure of the insert receiving pocket 166, the extracting force $F_E$ has a component in the forward direction $D_F$, pushing the cutting insert 101 out of the insert receiving pocket 166, until reaching the partially assembled position. The cutting insert 101 may then be pulled out, so as to be removed completely from the holder blade 153. In the transition to the partially assembled position, the first key member 176 remains within the insert key recess 128, however moving away from the pocket key recess 170, as the cutting insert 101 moves out of the insert receiving pocket 166. In the partially assembled position, the insert key recess 128 and the first key member 176 are spaced apart from the pocket key recess 170, as indicated in FIG. 16.

When mounting the cutting insert 101 into the insert receiving pocket 166, the cutting insert 101 is first inserted into the insert receiving pocket 166 until reaching the partially assembled position. Then, the cutting tool key 174 is engaged in the cutting tool 150, such that the first key member 176 is located within the insert key recess 128, which is spaced apart form the pocket key recess 170. The second key member 178 is simultaneously located in the holder passage 168. Then, in order to mount the cutting insert 101 into the insert receiving pocket 166, the cutting tool key 174 is rotated in the mounting direction $D_M$, for example by applying an appropriate force on the key handle 180. During rotation of the cutting tool key 174, the second key member 178 remains within the holder passage 168, such that the cutting tool key 174 is rotated about the key axis K.

The first key member 176 applies a mounting force $F_M$ on the cutting insert 101, through the insert recess wall 129 of the insert key recess 128. Due to the structure of the insert receiving pocket 166, the mounting force $F_M$ has a component in the rearward direction $D_R$, advancing the cutting insert 101 into the insert receiving pocket 166, until reaching the assembled position, that is, until the stopper abutment portion 114 abuts the lower jaw stopper surface 164.

Reference is now made to FIGS. 17-20, depicting a cutting tool 190 according to another embodiment of the present invention. The cutting tool 190 includes a holder blade 192 and a cutting insert 100'. The cutting insert 100' is similar to the cutting insert 100 described herein above with regards to FIGS. 5, 6A and 6B. The difference relative to the cutting insert 100, is that in the cutting insert 100' the second lower plane P2 and the upper plane P3 are parallel (i.e., the first angle α is a zero degree angle).

Figure 18:
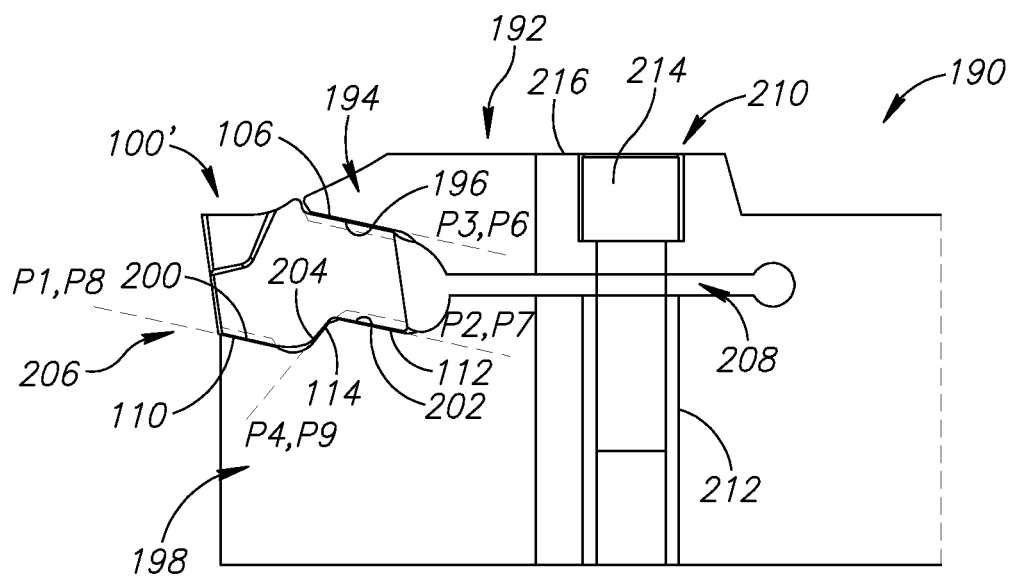
FIG. 18 is a side view of the cutting tool shown in FIG. 17.
Figure 19:
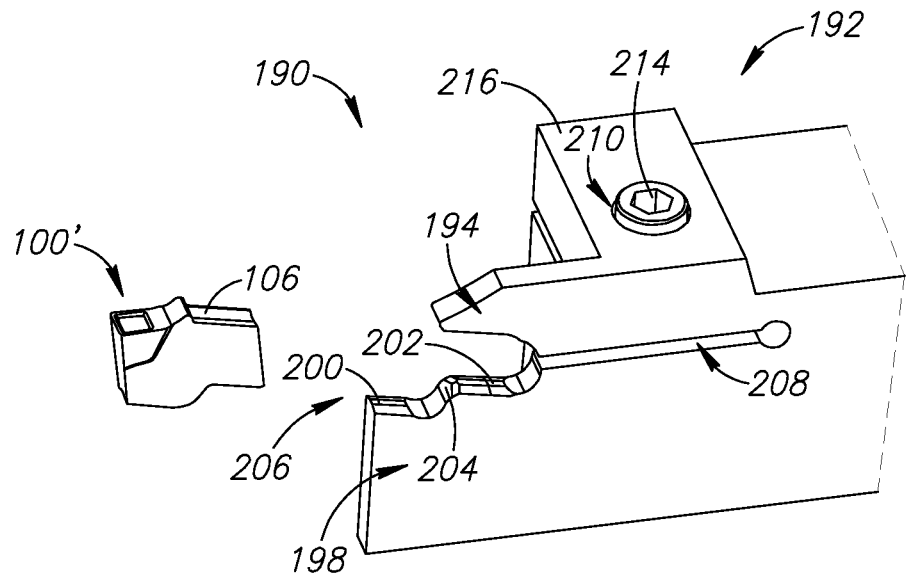
FIG. 19 is a perspective view of the cutting tool of FIG. 17, in a disassembled position.
Figure 20:
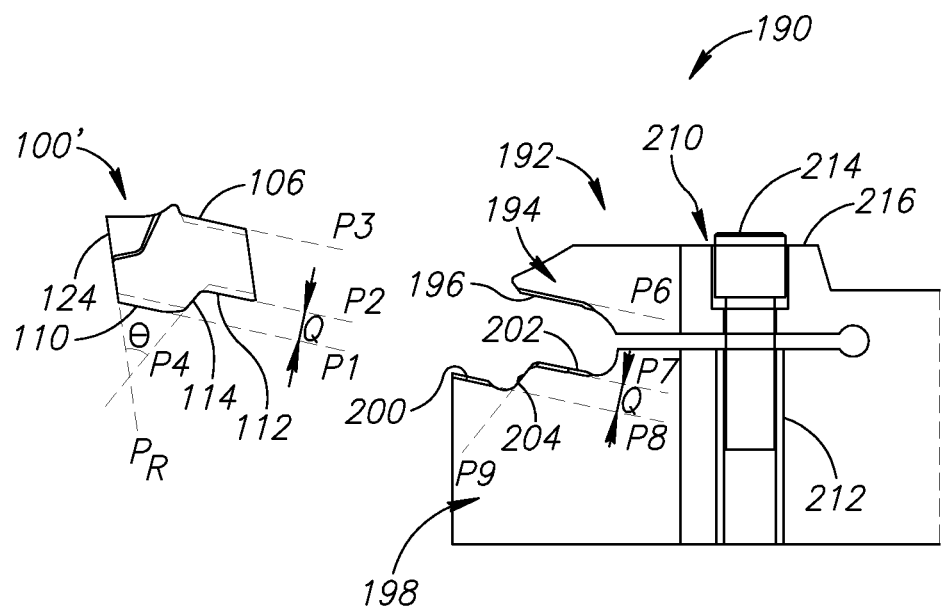
FIG. 20 is a side view of the cutting tool of FIG. 19.

The holder blade 192 includes an upper jaw 194 and a lower jaw 198, and an insert receiving pocket 206 defined there between. The holder blade 192 further has a release slot 208, opening out to, and extending substantially rearwards from the insert receiving pocket 206. A clamping bore 210 passes through the release slot 208 substantially rearwards of the insert receiving pocket 206, in a side view of the holder blade 192 (FIG. 18). The clamping bore 210 also opens out to a top surface 216 of the holder blade 192.

The upper jaw 194 has an upper jaw clamping surface 196. The lower jaw 198 has a first lower jaw clamping surface 200, a second lower jaw clamping surface 202, and a lower jaw stopper surface 204 located there between. The clamping bore 210 has a threaded portion 212 below the release slot 208, in a side view of the holder blade 192. The clamping bore 210 is adapted to receive a clamping screw 214, threadingly engaging the threaded portion 212.

In the holder blade 192, the upper jaw clamping surface 196 defines an upper jaw plane P6, and the second lower jaw clamping surface 202 defines a second lower jaw plane P7. In the present embodiment, the lower second jaw plane P7 is parallel to the upper jaw plane P6 (i.e., the third angle γ is a zero degree angle). The first lower jaw clamping surface 200 defines a first lower jaw plane P8, which is parallel to, and spaced apart from the second lower jaw plane P7, by the stopper height Q. The lower jaw stopper surface 214 defines a pocket stopper plane P9.

When the clamping screw 214 is loosened (FIGS. 19 and 20), i.e., not fastened in the clamping bore 210, the insert receiving pocket 206 provides sufficient space for inserting the cutting insert 100' therein. The cutting insert 100' is then fitted in between the upper and lower jaws 194, 198.

Figure 17:
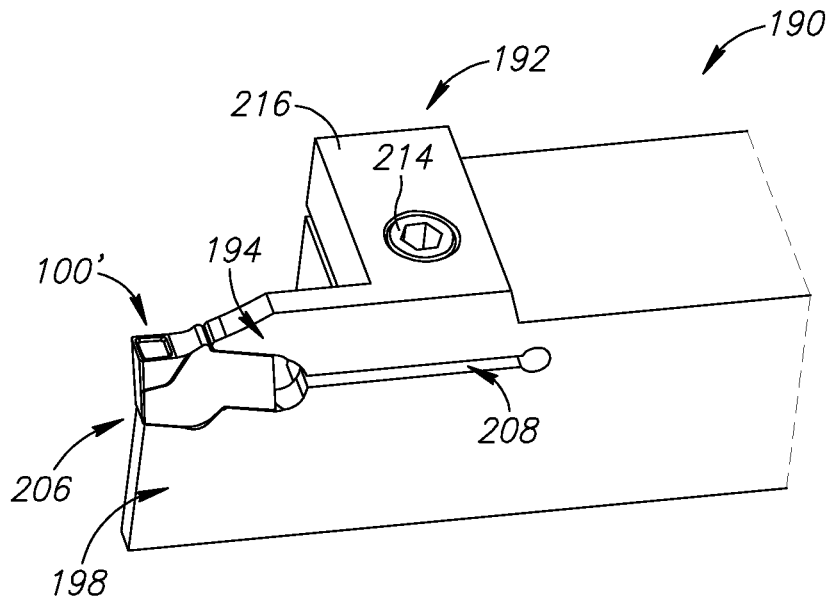
FIG. 17 is a schematic illustration perspective view of a cutting tool in accordance with a further embodiment of the present invention, in an assembled position.

In order to retain the cutting insert 100' in the insert receiving pocket 206, the clamping screw 214 is fastened in the clamping bore 210, further engaging the threaded portion 212 (FIGS. 17 and 18). The clamping screw 214 thus tightens the release slot 208, advancing the upper jaw 194 towards the lower jaw 198, thereby tightening the insert receiving pocket 206. In this manner, the cutting insert 100' is resiliently retained in the insert receiving pocket 206. In particular, the upper abutment portion 106 abuts the upper jaw clamping surface 196, and the first and second bottom abutment portions 110, 112 respectively abut the first and second lower jaw clamping surfaces 200, 202. Further, the stopper abutment portion 114 abuts the lower jaw stopper surface 204, thereby limiting the insertion of the cutting insert 100 into the insert receiving pocket 206 (i.e., preventing the cutting insert 100' from moving further into the insert receiving pocket 206).

It should be noted, that in the present embodiment, there is generally no need to apply force when inserting the cutting insert 100' into the insert receiving pocket 206. Instead, the cutting insert 100' is inserted into the insert receiving pocket 206 with substantially no resistance, and the fastening of the clamping screw 214 into the clamping bore 210 enables resilient retaining of the cutting insert 100'.

While the present invention has been described with reference to one or more specific embodiments, the description is intended to be illustrative as a whole and is not to be construed as limiting the invention to the embodiments shown. It is appreciated that various modifications may occur to those skilled in the art that, while not specifically shown herein, are nevertheless within the scope of the invention.

What is claimed is:

1. A cutting insert (100, 100', 101), comprising:
   an upper surface (102) including:
      a rake surface (104); and
      an upper abutment portion (106) defining an upper plane (P3);
   a bottom surface (108) including:
      a first bottom abutment portion (110) defining a first bottom plane (P1), forming a first angle (α) with the upper plane (P3);
      a second bottom abutment portion (112) defining a second bottom plane (P2) parallel to the first bottom plane (P1) and spaced apart therefrom; and
      a rearwardly facing stopper abutment portion (114) located between the first abutment portion and the second abutment portion in a front-to-rear direction of the bottom surface;
   a peripheral surface (116) including a front surface (118), a rear surface (120), and two insert side surfaces (122) extending therebetween, the front surface (118) having a relief surface (124); and
   a cutting edge (126) formed at the intersection of the rake surface (104) and the relief surface (124), and
   wherein a reference plane (P5) perpendicular to the upper plane (P3) and passing through the upper abutment portion (106), intersects the first and second bottom planes (P1, P2) at first and second intersection lines (I1, I2), respectively, the first and second intersection lines (I1, I2) being spaced apart from the first and second bottom abutment portions (110, 112), respectively.

2. The cutting insert (101) of claim 1, further comprising an insert key recess (128) opening out to the bottom surface (108) and to the insert side surfaces (122).

3. The cutting insert (101) of claim 2, wherein the insert key recess (128) includes an insert recess wall (129) having a circular wall portion (131).

4. The cutting insert (100, 101) of claim 1, wherein the first angle (α) is an acute angle.

5. The cutting insert (100') of claim 1, wherein the first angle (α) is a zero degree angle, and the second bottom plane (P2) is parallel to the upper plane (P3).

6. The cutting insert (100, 100', 101) of claim 1, wherein:
   the stopper abutment portion defines a stopper plane (P4), and the relief surface (124) defines a relief plane ($P_R$) forming a second angle (θ) with the stopper plane (P4).

7. The cutting insert (100, 100', 101) of claim 6, wherein the second angle (θ) is an acute angle in the range of 30°-70°.

8. The cutting insert (100, 100', 101) of claim 7, wherein the second angle (θ) is a 50° angle.

9. The cutting insert (100, 100', 101) of claim 1, wherein the front surface (118) has a front height dimension (H) and the rear surface (120) has a rear height dimension (h), and the front height dimension (H) is between 1.2-2 times greater than the rear height dimension (h).

10. The cutting insert (100, 100', 101) of claim 1, wherein the front surface (118) has a front height dimension (H), the second bottom plane (P2) is spaced apart from the first bottom plane (P1) by a stopper height (Q), and a rear height dimension (h) is greater than the stopper height (Q).

11. The cutting insert (100, 100', 101) of claim 10, wherein the rear height dimension (h) between 1.2-3 times greater than the stopper height (Q).

12. The cutting insert (100, 100', 101) of claim 1, wherein the upper abutment portion (106) and the first and second bottom abutment portions (110, 112), have a V-shaped cross section.

13. The cutting insert (100, 100', 101) of claim 1, wherein the stopper abutment portion (114) has a V-shaped cross section.

14. A cutting tool (150, 190) comprising a holder blade (152, 153, 192) and a cutting insert (100, 101, 100') in accordance with claim 1 retained therein.

15. The cutting tool (150) according to claim 14, wherein:
the holder blade (152, 153) comprises:
an upper jaw (154) having an upper jaw clamping surface (156);
a lower jaw (158) having a first lower jaw clamping surface (160), a second lower jaw clamping surface (162), and a forwardly facing lower jaw stopper surface (164) located between the first lower jaw clamping surface and the second lower jaw clamping surface in a front-to-rear direction of the lower jaw; and
an insert receiving pocket (166) defined between the upper jaw (154) and the lower jaw (158); and
a holder passage (168) located in the lower jaw (158) below the insert receiving pocket (166) in a side view of the holder blade (152, 153),
and wherein the cutting insert (100, 101) is resiliently retained within the insert receiving pocket (166), such that the upper abutment portion (106) abuts the upper jaw clamping surface (156), the first and second bottom abutment portions (110, 112) respectively abut the lower jaw first and second clamping surfaces (160, 162), and the stopper abutment portion (114) abuts the lower jaw stopper surface (164), thereby limiting the extent of insertion of the cutting insert (100, 101) into the insert receiving pocket (166).

16. The cutting tool (150) of claim 14, wherein the holder blade (152) further includes a pocket key recess (170) formed at a rearmost end (172) of the insert receiving pocket (166).

17. The cutting tool (150) of claim 14, wherein the holder blade (153) further includes a pocket key recess (170) formed in the lower jaw (158) between the second lower jaw clamping surface (162) and the lower jaw stopper surface (164).

18. The cutting tool (150) of claim 15, wherein the upper jaw clamping surface (156) defines an upper jaw plane (P6), and the second lower jaw clamping surface (162) defines a second lower jaw plane (P7), forming a third angle (γ) with the upper jaw plane (P6).

19. The cutting tool (150) of claim 18, wherein the third angle (γ) is smaller than the first angle (α), to allow a resilient fit of the cutting insert (100, 101) within the insert receiving pocket (166).

20. The cutting tool (150) of claim 14, in combination with a cutting tool key (174) comprising a first key member (176) and a second key member (178), wherein the first key member (176) is formed to fit into a pocket key recess (170) adjacent the cutting insert (100, 101), and the second key member (178) is formed to fit into a holder passage (168).

21. The cutting tool (150) of claim 20, in combination with the cutting tool key (174), wherein
the cutting insert (101) includes an insert key recess (128) opening out to the bottom surface (108) and to the insert side surfaces (122), and
the first key member (176) is formed to fit into the pocket key recess (170) and the insert key recess (128) simultaneously.

22. The cutting tool (150) of claim 20 in combination with the cutting tool key (174), wherein
in an assembled position of the cutting tool (150) with the cutting tool key (174) engaged to the cutting tool (150), the first key member (176) is located in the pocket key recess (170) and the second key member (178) is located in the holder passage (168), and
in a partially assembled position of the cutting tool (150) with the cutting tool key (174) engaged to the cutting tool (150), the first key member (176) is spaced apart from the pocket key recess (170) and the second key member (178) is located in the holder passage (168).

23. The cutting tool (150) of claim 22, wherein in the partially assembled position of the cutting tool (150) with the cutting tool key (174) engaged to the cutting tool (150), the first key member (176) is located adjacent the front surface (118) or the rear surface (120) of the cutting insert (100).

24. The cutting tool (150) of claim 22, wherein in the partially assembled position of the cutting tool (150) with the cutting tool key (174) engaged to the cutting tool (150), the first key member (176) is located within the insert key recess (128) of the cutting insert (101).

25. The cutting tool (150) according to claim 14, wherein:
the holder blade (192) comprises:
an upper jaw (194) having an upper jaw clamping surface (196);
a lower jaw (198) having a first lower jaw clamping surface (200), a second lower jaw clamping surface (202), and a forwardly facing lower jaw stopper surface (204) located between the first lower jaw clamping surface and the second lower jaw clamping surface in a front-to-rear direction of the lower jaw; and
an insert receiving pocket (206) defined between the upper jaw (194) and the lower jaw (198);
a release slot (208) opening out to, and extending from the insert receiving pocket (206); and
a clamping bore (210) passing through the release slot (208), for receiving a clamping screw (214),
when the clamping screw (214) is fastened in the clamping bore (210), the insert receiving pocket (206) is tightened until the cutting insert (100) is resiliently retained therein, the upper abutment portion (106) abuts the upper jaw clamping surface (196), the first and second bottom abutment portions (110, 112) respectively abut the lower jaw first and second clamping surfaces (200, 202), and the stopper abutment portion (114) abuts the lower jaw stopper surface (204), thereby limiting the insertion of the cutting insert (100) into the insert receiving pocket (206).

26. A holder blade (152, 153) comprising:

two longitudinally extending holder side surfaces (155);

an upper jaw (154) having an upper jaw clamping surface (156) defining an upper jaw plane (P6);

a lower jaw (158) connected to the upper jaw (154), the lower jaw (158) having a first lower jaw clamping surface (160), a second lower jaw clamping surface (162) and a forwardly facing lower jaw stopper surface (164) located between the first lower jaw clamping surface and the second lower jaw clamping surface in a front-to-rear direction of the lower jaw, wherein the second lower jaw clamping surface (160) forms a third angle ($\gamma$) with the upper jaw plane (P6) and is parallel to and spaced apart from the first lower jaw clamping surface (162);

an insert receiving pocket (166) defined between the upper jaw (154) and the lower jaw (158), the insert receiving pocket (166) having a closed rearmost end (172); and a holder passage (168) located in the lower jaw (158) below the insert receiving pocket (166) in a side view of the holder blade (152, 153).

* * * * *